United States Patent [19]

Franzke

[11] Patent Number: 5,115,829
[45] Date of Patent: May 26, 1992

[54] SEISMICALLY TRIGGERED VALVE

[75] Inventor: Richard E. Franzke, North Fork, Calif.

[73] Assignee: Ralph R. Swenson, Modesto, Calif.; a part interest

[21] Appl. No.: 723,461

[22] Filed: Jun. 28, 1991

[51] Int. Cl.⁵ .............................. F16K 17/36
[52] U.S. Cl. ............................ 137/38; 251/65
[58] Field of Search ................. 137/38; 251/65

[56] References Cited

U.S. PATENT DOCUMENTS

| | | | |
|---|---|---|---|
| 4,640,303 | 2/1987 | Greenberg | 137/38 |
| 4,785,842 | 11/1988 | Johnson | 137/38 |
| 4,817,657 | 4/1989 | Kovacs | 137/38 |

FOREIGN PATENT DOCUMENTS

| | | | |
|---|---|---|---|
| 2816 | 1/1980 | Japan | 137/38 |
| 119265 | 9/1980 | Japan | 137/38 |
| 61873 | 4/1982 | Japan | 137/38 |

Primary Examiner—Robert G. Nilson
Attorney, Agent, or Firm—James B. Middleton

[57] ABSTRACT

A seismically triggered valve is designed to shut off gas supply during an earthquake. A valve member is pivoted within a valve body, the valve member being mechanically movable to the open position by a plunger. A magnet is fixed to the valve member, and a ferromagnetic ball is free on a concave surface. The center of the concave surface is aligned with the magnet; but, when the valve is shaken the ball moves and releases the magnet. Gravity moves the valve member to the closed position, and the valve member is held in the closed position by magnetic attraction.

7 Claims, 2 Drawing Sheets

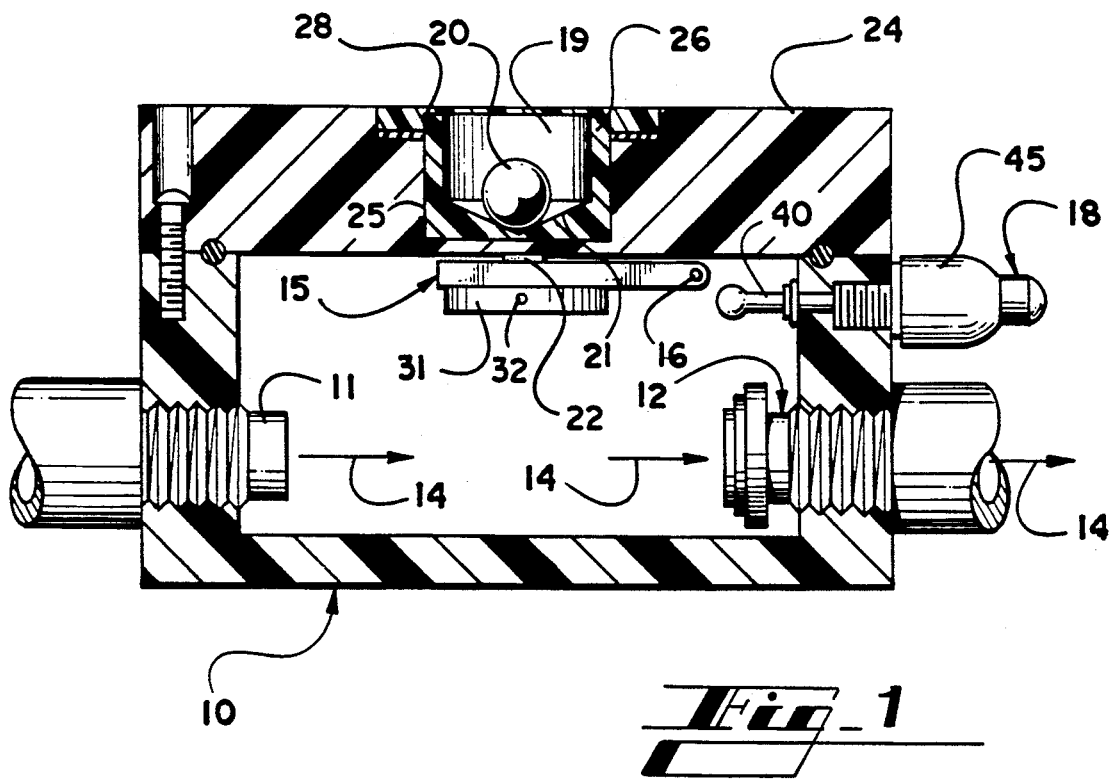
Fig_1
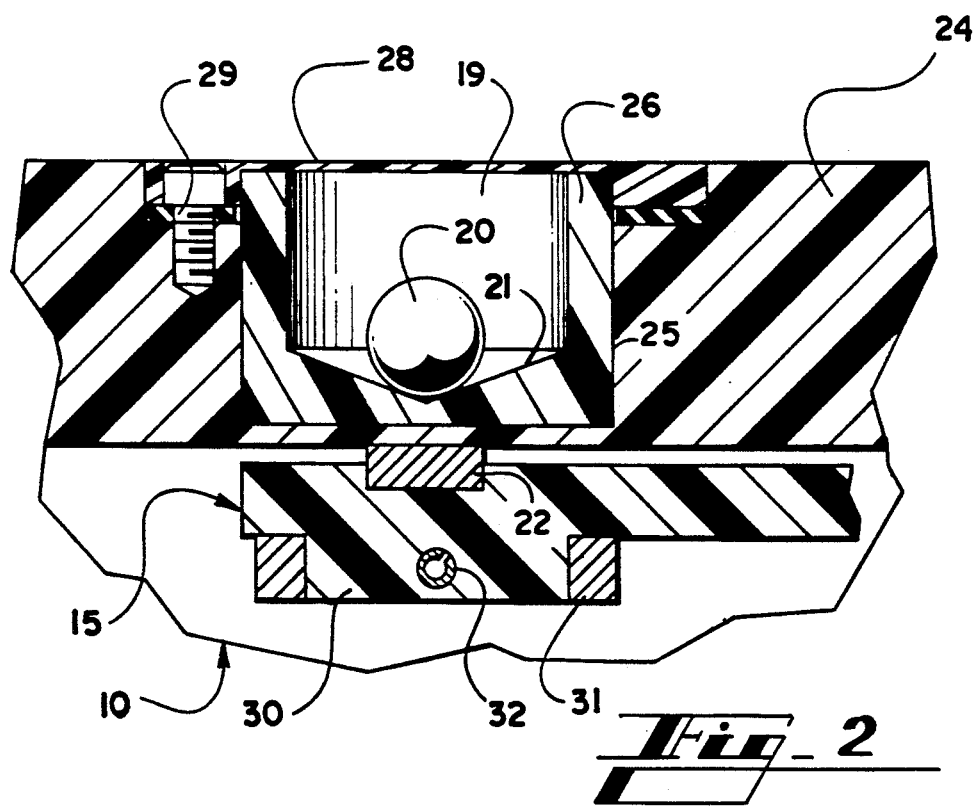
Fig_2

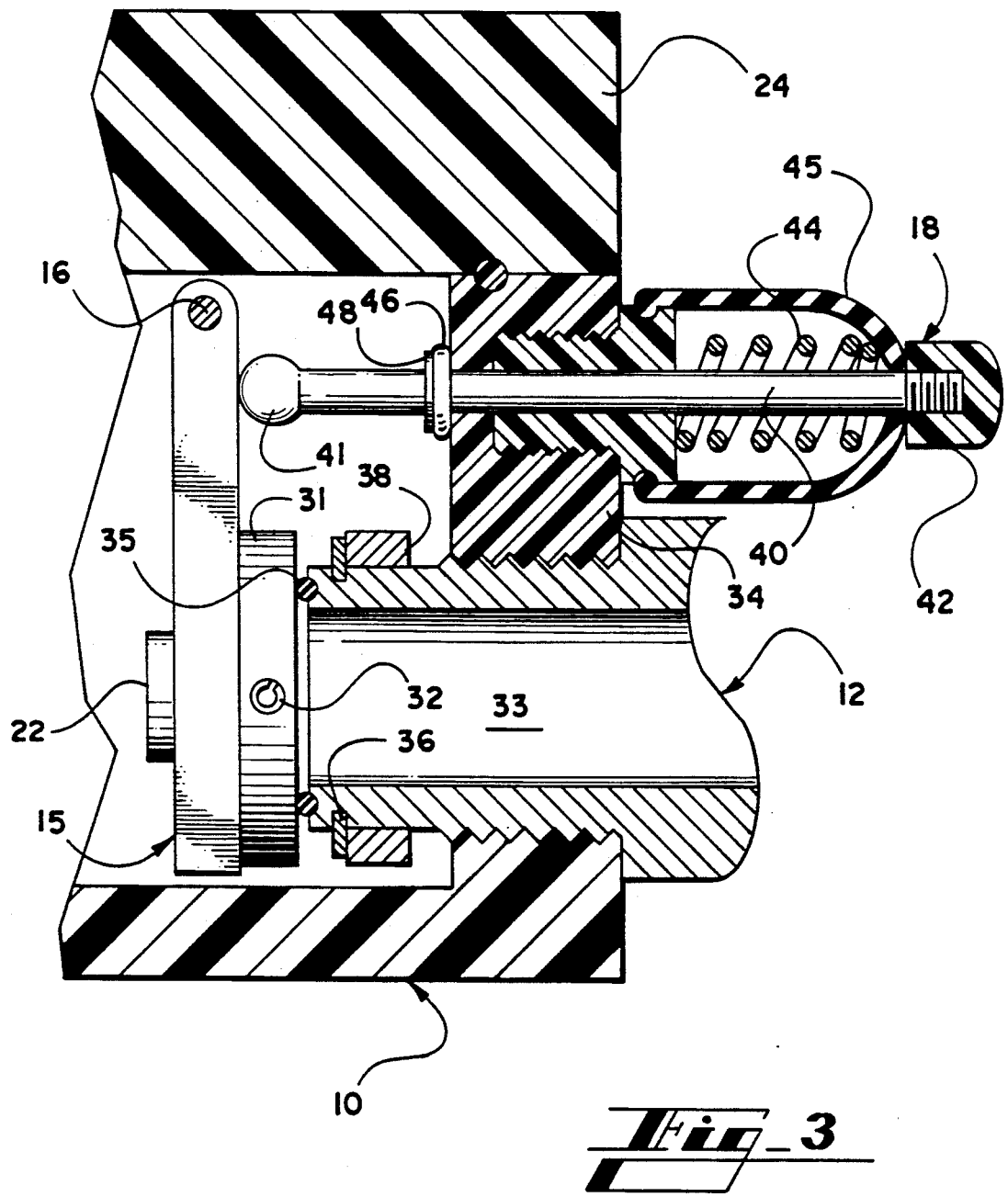
Fig_3

SEISMICALLY TRIGGERED VALVE

In areas of the world in which earthquakes, or seisms, are reasonably expectable there is concern for collateral damage flowing from the seism. By way of example, even though a relatively slight amount of damage may be caused to a structure, it is possible that a gas line will be broken, and major damage may be caused by a gas explosion. In an effort to prevent such collateral damage, there have automatically operable valves and the like to terminate the of gas or other fluids early in the occurrence of a seismic event.

The prior art valves have generally been rather complex mechanically, frequently including one or more linkages that must be operated to open or close the valve. Other valves may be somewhat simpler, but none of prior art valves is easily variable so that the severity the seism required to operate the valve can be changed at will.

SUMMARY OF THE INVENTION

This invention relates generally to automatically operable valves, and is more particularly concerned with a valve automatically closable on occurrence of a seismic event of a predetermined severity.

The present invention provides a valve body having a movable valve member therein. The movable valve member has a first position in which it is held by magnetic attraction to a seism sensing member, and a second position in which it closes the exit port from the valve body. Since the valve is held open by magnetic attraction, the holding force can be varied by varying the strength of the magnet, or by varying the size of the ferromagnetic member to which the magnet is attracted.

In the preferred embodiment of the invention, the seismic sensing member includes a ferromagnetic ball received in a concavity, the concavity having a lowest point to which the ball gravitates. A magnet on the movable valve member is aligned with the lowest point of the concavity, so juxtaposition of the magnet and the ball holds the movable valve member in its first position. Movement of the ball, due to shaking of the valve body, can release the magnet and allow the movable valve member to move to the second position.

BRIEF DESCRIPTION OF THE DRAWINGS

These and other features and advantages of the present invention will become apparent from consideration of the following specification when taken in conjunction with the accompanying drawings in which:

FIG. 1 is a longitudinal cross-sectional view showing one form of valve made in accordance with the present invention;

FIG. 2 is an enlarged, cross-sectional view showing the construction of the concavity and the movable valve member; and, FIG. 3 is an enlarged, cross-sectional view of the exit end of the valve body showing the exit port and the valve opening means.

DETAILED DESCRIPTION OF THE EMBODIMENT

Referring now more particularly to the drawings, and to that embodiment of the invention here shown by way of illustration, the valve in FIG. 1 includes a valve body 10 having an entrance port 11 and an exit port 12, so fluid will flow through the valve body 10 in the direction indicated by the arrows 14. A pivotal valve member 15 is here illustrated in the open position, which is to say the valve is arranged to allow fluid flow through the valve body 10. The valve member 15 is pivoted at 16 so the member 15 can move down and close the exit port 12. The valve member 15 ca be returned to the position shown in FIG. 1 by the plunger assembly indicated at 18.

Above the valve member 15 there is a concavity 19 which receives a ball 20. The concavity 19 has a conically shaped floor 21, so the ball 20 tends to roll to the apex of the cone. At this location, the ball 20 is juxtaposed over the magnet 22 which is carried by the valve member 15.

In view of the foregoing, it will be understood that the entrance port 11 will be connected to a supply line for natural gas or other fluid to be controlled by the valve, and the exit port 12 will be connected to the appliance or the like that is to utilize the fluid. In its normal, open, position, the valve 10 is as shown in FIG. 1 of the drawings. The valve member 15 is up, with the magnet 22 adjacent to the ferromagnetic ball 20. The valve member 15 is thereby held in the open position.

If something causes shaking of the valve body 10, such as a seism or the like, the shaking of the valve body 10 will cause the ball 20 to move; and, it will be realized that it is rather easy for the ball 20 to move up the sloped surface of the surface 21. If the shaking, or trembling, is very slight, the magnetic force will retain the valve member 15 in the open position. However, if the seismic activity is sufficiently strong, the ball 20 will move far enough from the center of the surface 21 that the magnetic attraction will be broken, and the valve member 15 will pivot downwardly by gravity and close the exit port 12.

With the above general discussion in mind, attention is directed to FIG. 2 of the drawings which shows the concavity 19 and valve member 15 in more detail. In FIG. 2 it will be seen that the cover 24 of the valve body 10 defines a bore 25 which removably receives an insert 26 the insert 26 having the concavity 19 and the conical surface 21. The insert 26 and the ball 20 are held in place by a cap 28. The cap is fixed to the cover 24 by a plurality of screws such as the screw 29.

Considering the operation of the present invention as described above, it will be recognized that the sensitivity of the valve of the present invention can be varied by varying the slope of the surface 21. If the surface 21 is nearly flat, the slightest vibration will cause a large movement of the ball 20, and consequent release of the magnetically held valve member 15. Contrarily, if the surface 21 is steeply sloped, quite severe shaking will be required to cause significant lateral and/or vertical motion of the ball 20.

As shown in the drawings, the surface 21 is sloped at about 15 degrees, which is to say the base angle of the cone forming the surface 21 is 15 degrees. This angle works quite well, but of course any other angle may be selected as desired. Also, the angle of the surface 21 is only one aspect of the sensitivity, so other features must be considered.

If a very large ball 20 is used as the sensing device, it will be readily recognized that the inertia of the ball will slow the reaction of the valve, and the mass of the ball will determine the distance the ball moves under the influence of a given force. Therefore, a large ball 20 will remain close to the apex of the surface 21 for a longer time, with greater forces exerted, than a small ball 20. As a result, one can vary the sensitivity of the valve simply by changing the size of the ball 20.

The strength of the magnet 22 is another variable that will change the sensitivity of the valve. A stronger magnet 22 will obviously tend to lessen the sensitivity, while a weaker magnet 22 will increase sensitivity. The magnet 22 is not as easy to exchange as the insert 26 and ball 20, but this is at least possible during design and manufacture.

Continuing to look at FIG. 2, attention is directed to the valve member 15. In FIG. 2 it can be seen that the valve member 15 is preferably made of a plastic material, and the member is here shown as having an integrally formed sealing member 30. With a properly engineered valve, the integral member 30 may be the best; however, if it is preferred, the sealing member 30 can be separately formed and subsequently attached to the valve member 15 to allow some variation in placement of the sealing member 30.

The valve member 15 in FIG. 2 is shown in cross-section, and it can be seen that there is a magnet 31 surrounding the sealing member 30. This magnet 31 is secured by a pin 32, and will be discussed in detail in conjunction with FIG. 3 of the drawings.

FIG. 3 illustrates the discharge, or exit end of the valve body 10, and shows the exit port 12 and the reset plunger 18 in detail. The valve member 15 is shown in the closed position.

The exit port 12 includes a nipple 33 that extends through the end wall 34 of the valve body 10. The external end of the nipple is broken away but the nipple would be attachable to conventional piping by conventional means.

The inner end of the exit port 12 is adapted to be closed by the valve member 15, and specifically to receive the sealing member 30 thereagainst. It will thus be seen that the exit port 12 includes an O-ring 35 at the innermost end of the nipple 33, the O-ring 35 directly receiving the sealing member 30 Adjacent to the O-ring 35, there is a locking ring 36 locked into an appropriate groove in the nipple 33; and, next to the locking ring 36 is an annular member 38. The annular member 38 may be a magnet, or may be simply ferromagnetic material.

It will be remembered that the sealing member 30 is surrounded by a magnet 31. With the valve member 15 in the closed position as shown in FIG. 3, the magnet 31 is adjacent to the annular member 38. Thus, magnetic attraction between the two will assist in holding the valve member 15 in the closed position. It will also be recognized that the valve body 10 is arranged so that the normal fluid pressure acts to urge the valve towards its closed position.

When the valve of the present invention is to be opened, the plunger 18 is used to move the valve member 15 to its open position. The plunger 18 is a simple mechanical arrangement including a shaft 40 having a sphere 41 on the inner end and a cap 42 on the outer end. The cap 42 is shown as threadedly received on the shaft 40 to allow insertion of the shaft 40 through the wall 34.

Externally of the valve body 10, a spring 44 extends between the valve body 10 and the cap 42 so the shaft 40 is normally biased out, allowing the valve member 15 to close without interference. Preferably a boot 45 covers the spring 44 to prevent the inadvertent escape of gas into the atmosphere.

To seal the shaft 40 with respect to the valve body 10, there is an O-ring 46 surrounding the shaft 40 adjacent to the wall 34. A snap ring 48 limits axial motion of the O-ring 46; therefore, as the spring 44 urges the shaft 40 outwardly, the O-ring 46 is pushed against the wall 34 and effectively seals the shaft with respect to the valve body.

It should now be understood that, when the valve is to be opened, one will push the plunger 18 inwardly, towards the valve member 15. With the first small movement, some pressure will be released from the valve body 10 because the O-ring 46 will move away from the wall 34. Further movement of the plunger 18 will cause the valve member 15 to pivot about the pivot 16; and, continued motion will place the valve member 15 in the horizontal position shown in FIGS. 1 and 2. Assuming a ball 20 is in place, the magnet 22 will be attracted to the ball to hold the valve member 15 in its open position.

Those skilled in the art will realize that many magnetic materials can be selected for the magnets 22 and 31. It is preferable, however, to use rare earth magnets because of the strength of these magnets, and the permanence of the magnets. For example, it is contemplated that magnets of either samarium cobalt or neodymium iron boron will be used.

The valve of the present invention is illustrated as being formed of a plastic material, and materials such as methylmethacrylate, polycarbonate and many others are suitable. The device can also be made of metal, but non-magnetic metals must be used except for the parts specifically noted as ferromagnetic.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. An automatically operable valve comprising a valve body, an entrance port for admitting fluid to said valve body, and an exit port for allowing fluid to exit from said valve body, a valve member for closing said exit port, said valve member being movable from a first position in which said exit port is open to a second position in which said exit port is closed, seismically sensitive magnetic means for holding said valve member in said first position, said valve member being movable to said second position by gravity, and mechanical means for moving said valve member from said second position to said first position, said seismically sensitive magnetic means including a magnet carried by said valve member, a concave surface having an apex at its lowest point, said apex being juxtaposed over said magnet carried by said valve member when said valve member is in said first position, and a ferromagnetic ball received on said concave surface.

2. An automatically operable valve as claimed in claim 1, said valve body defining a bore therein, an insert receivable within said bore, said insert including said concave surface.

3. An automatically operable valve as claimed in claim 2, wherein said concave surface is conical.

4. An automatically operable valve as claimed in claim 2, wherein said magnet consists of a rare earth magnet.

5. An automatically operable valve comprising a valve body, an entrance port for admitting fluid to said valve body, and an exit port for allowing fluid to exit from said valve body, a valve member for closing said exit port, said valve member being movable from a first position in which said exit port is open to a second position in which said exit port is closed, seismically sensitive magnetic means for holding said valve member in said first position, said valve member being movable to said second position by gravity, and mechanical means for moving said valve member from said second position to said first position, said valve member including a sealing member engageable with said exit port, a magnet surrounding said sealing member, and an annular member carried by said exit port, the arrangement being such that said magnet attracts said annular member to hold said valve member in said second position.

6. An automatically operable valve as claimed in claim 5, and including an O-ring carried by said exit port for engaging said sealing member of said valve member.

7. An automatically operable valve comprising a valve body, an entrance port for admitting fluid to said valve body, and an exit port for allowing fluid to exit from said valve body, a valve member for closing said exit port, said valve member being movable from a first position in which said exit port is open to a second position in which said exit port is closed, seismically sensitive magnetic means for holding said valve member in said first position, said valve member being movable to said second position by gravity, and mechanical means for moving said valve member from said second position to said first position, said mechanical means for moving said valve member including a shaft having an inner end within said valve body and an outer end outside said valve body, spring means for normally urging said shaft towards said outer end, said inner end being located to engage said valve member when said valve member is in said second position, and further including a stop for limiting the movement of said shaft in a direction towards said outer end, said stop including sealing means for sealing said shaft with respect to said valve body, and further including a boot substantially covering said spring means.

* * * * *